United States Patent
Takahashi et al.

(10) Patent No.: US 10,946,872 B2
(45) Date of Patent: Mar. 16, 2021

(54) VEHICLE CONTROL DEVICE

(71) Applicant: HONDA MOTOR CO., LTD., Tokyo (JP)

(72) Inventors: Kazuyuki Takahashi, Wako (JP); Daichi Kato, Wako (JP); Hiroshi Oguro, Wako (JP)

(73) Assignee: Honda Motor Co., Ltd., Tokyo (JP)

( * ) Notice: Subject to any disclaimer, the term of this patent is extended or adjusted under 35 U.S.C. 154(b) by 219 days.

(21) Appl. No.: 16/342,706

(22) PCT Filed: Oct. 18, 2016

(86) PCT No.: PCT/JP2016/080781
§ 371 (c)(1),
(2) Date: Apr. 17, 2019

(87) PCT Pub. No.: WO2018/073884
PCT Pub. Date: Apr. 26, 2018

(65) Prior Publication Data
US 2019/0291748 A1 Sep. 26, 2019

(51) Int. Cl.
*B60W 50/14* (2020.01)
*B60W 30/18* (2012.01)
*G05D 1/00* (2006.01)
*G05D 1/02* (2020.01)
*B60W 30/095* (2012.01)

(52) U.S. Cl.
CPC .......... *B60W 50/14* (2013.01); *B60W 30/095* (2013.01); *B60W 30/18* (2013.01); *G05D 1/0088* (2013.01); *G05D 1/0212* (2013.01); *B60W 2050/146* (2013.01); *B60W 2554/00* (2020.02); *B60W 2554/80* (2020.02); *B60W 2555/60* (2020.02); *G05D 2201/0213* (2013.01)

(58) Field of Classification Search
CPC ..................................................... B60W 50/14
See application file for complete search history.

(56) References Cited

U.S. PATENT DOCUMENTS

| 2016/0180716 A1* | 6/2016 | Roger | G08G 5/0047 701/3 |
|---|---|---|---|
| 2017/0229025 A1* | 8/2017 | Klinger | H04B 7/18506 |
| 2019/0227552 A1* | 7/2019 | Kato | G05D 1/0088 |
| 2019/0300010 A1* | 10/2019 | Miyauchi | B60W 50/14 |

FOREIGN PATENT DOCUMENTS

| JP | 2010-250772 A | 11/2010 |
|---|---|---|
| JP | 5306934 B2 | 10/2013 |

OTHER PUBLICATIONS

PCT/ISA/210 from International application publication of PCT/JP2016/080781 and the English translation thereof.

* cited by examiner

*Primary Examiner* — Alex C Dunn
(74) *Attorney, Agent, or Firm* — Carrier Blackman & Associates, P.C.; Joseph P. Carrier; William D. Blackman

(57) ABSTRACT

In the present invention, a short-term route (provided at a timing for starting automatic driving) for automatic driving control that uses local environment map information generated constantly by a local environment map generation unit is generated continuously even when automatic driving is not set to an on state by an automatic driving switch. As a result, it is possible to instantly control the automatic driving of a vehicle by the continuously generated short-term route after transitioning to the on state of the automatic driving switch.

8 Claims, 8 Drawing Sheets

FIG. 7 COMPARATIVE EXAMPLE

VEHICLE CONTROL DEVICE

TECHNICAL FIELD

The present invention relates to a vehicle control device suitable for being applied to a vehicle that is capable of being driven automatically (including an automated driving assist).

BACKGROUND ART

In Japanese Patent No. 5306934 (hereinafter referred to as JP5306934B), a control system is disclosed which, in order to generate a plurality of action objectives, is equipped with a plurality of modules (referred to as action objective generation modules) which are hierarchized in accordance with a length of the operation cycles thereof, and wherein a control object is controlled through a control module in accordance with calculation results of the plurality of action objective generation modules. A specific control object that is controlled by such a control system is a leg type robot.

JP5306934B includes the action objective generation modules which are divided into three layers in accordance with the operation cycles, and the action objective generation module having the longest operation cycle is placed in charge of moving the robot to the target position, the action objective generation module having an intermediate operation cycle is placed in charge of causing the robot to avoid contact with objects, and the action objective generation module having a short operation cycle is placed in charge of stabilizing the posture of the robot.

In such a hierarchical control system, a configuration is provided in which behaviors of the control object are controlled in a manner so that evaluation results produced by an action objective generation module having a shorter operation cycle are preferentially reflected more so than the evaluation results produced by an action objective generation module having a longer operation cycle (see claim 1 of JP5306934B).

SUMMARY OF INVENTION

Incidentally, in a vehicle capable of being driven automatically (including an automated driving assist), it is a matter of course that the vehicle is made to reach a target position by traveling on a road while satisfying conditions of adaptability and responsiveness with respect to the recognized travel environment in the immediate vicinity, and emphasis is placed on the comfortableness and riding comfort of the vehicle occupants, for example, the smoothness of changes in behavior of the vehicle, which is similar to that of an exemplary driver.

However, according to JP5306934B, as a result of being concerned with a legged robot or the like, since a configuration is provided in which behaviors of the legged robot are controlled momentarily from time to time in a manner in which the evaluation results by an action objective generation module having a shorter operation cycle are reflected in a preferential manner, and the robot is made to reach the target position, there is room for improvement in relation to enhancing the smoothness of changes in behavior of the control object (riding comfort of occupants).

The present invention has been devised taking into consideration the aforementioned problem, and has the object of providing a vehicle control device that can be appropriately applied to a trajectory generation process of an automatically driven vehicle (including a vehicle in which an automated driving assist is implemented).

A vehicle control device according to the present invention is characterized by a vehicle control device that controls a vehicle configured to be driven automatically, comprising a long-term trajectory generating unit configured to generate a long-term trajectory having a long period whose operation cycle is relatively long, a short-term trajectory generating unit configured to generate a short-term trajectory with reference to the generated long-term trajectory, and having a short period which is shorter than the long period, an automated driving ON setting unit configured to set automated driving to an ON state, and an integrated control unit configured to control these elements, wherein, when the automated driving is set to the ON state by the automated driving ON setting unit, the integrated control unit is configured to control the vehicle on a basis of the long-term trajectory and the short-term trajectory generated by the long-term trajectory generating unit and the short-term trajectory generating unit, and when the automated driving is not set to the ON state, the integrated control unit is configured to continue to generate the short-term trajectory by the short-term trajectory generating unit.

According to the present invention, when automated driving is not set to the ON state by the automated driving ON setting unit, generation of a short-term trajectory is continued in preparation for a timing at which automated driving is started. Therefore, when automated driving is set to the ON state by the automated driving ON state setting unit, at the time of the ON state, it is possible to perform an automated driving control for the vehicle on the basis of the short-term trajectory which was continuously generated in preparation for the timing at which automated driving is started. Further, when not in the ON state, since it is possible to stop the long-term trajectory generating unit, which generates a trajectory with emphasis placed on riding comfort and comfortability, the processing content can be prevented from being wasted.

In this case, the vehicle control device is preferably configured so as to further comprise a recognition result receiving unit configured to receive external environment recognition information around a periphery of a host vehicle, and an environment map generating unit configured to receive the external environment recognition information, and generate information indicative of a situation around the periphery of the host vehicle, wherein the information indicative of the situation around the periphery of the host vehicle which is generated by the environment map generating unit is continuously input to the short-term trajectory generating unit.

In accordance with such a configuration, since the information indicative of the situation around the periphery of the host vehicle is continuously input to the short-term trajectory generating unit, when automated driving is set to the ON state by the automated driving ON setting unit, control (automated driving) of the vehicle in accordance with the short-term trajectory corresponding to the information indicative of the situation around the periphery of the host vehicle can be started instantaneously.

Further, the information indicative of the situation around the periphery of the host vehicle is preferably generated in synchronism with the short period and in a time period that is less than the short period.

Since the situation around the periphery of the host vehicle is continuously generated within a time period that is shorter than the short period, which is the generation period of the short-term trajectory that is generated using information indicative of the situation around the periphery of the host vehicle, and is generated in synchronism with the short period, it is possible to secure generation of the short-term trajectory within the short period.

Furthermore, a configuration may be provided in which each of the short-term trajectory generating unit and the environment map generating unit further comprises a counter whose count value is updated when information thereof is updated and generated, and when the automated driving is set to the ON state by the automated driving ON setting unit, the integrated control unit is configured to determine whether or not the respective count values of the respective counters are updated, and in a case of being updated, control the vehicle on a basis of at least the short-term trajectory generated by the short term-trajectory generating unit from among the long-term trajectory generating unit and the short-term trajectory generating unit.

In the foregoing manner, when the respective count values of each of the counters are updated, since the vehicle is controlled on the basis of at least the short-term trajectory generated by the short-term trajectory generating unit from among the long-term trajectory generating unit and the short-term trajectory generating unit, the reliability of the generated short-term trajectory is further ensured.

The vehicle control device preferably further comprises an automated driving possibility notification unit configured to issue a notification that automated driving is possible when it is determined by the integrated control unit that automated driving may be initiated, each of the short-term trajectory generating unit and the environment map generating unit is preferably equipped with a counter whose count value is updated when information thereof is updated and generated, and when the automated driving is set to the ON state by the automated driving ON setting unit, the integrated control unit is configured to determine whether or not the count values of the counters are updated, and in a case of being updated, issue the notification that automated driving is possible through the automated driving possibility notification unit, and thereafter, when the automated driving is set again to the ON state by the automated driving ON setting unit, preferably control the vehicle on a basis of at least the short-term trajectory generated by the short term-trajectory generating unit from among the long-term trajectory generating unit and the short-term trajectory generating unit.

By controlling the vehicle in this manner, it becomes possible for automated driving to be initiated with the short-term trajectory that is generated with high reliability, and it is possible to more reliably confirm the intention of the driver to initiate automated driving.

The long-term trajectory generating unit, in addition to the long-term trajectory generating unit, may be divided into a medium-term trajectory generating unit configured to generate a medium-term trajectory having a medium period that is relatively longer than the short period and relatively shorter than the long period.

In this case, when automated driving is implemented, at first, the vehicle is controlled in accordance with the short-term trajectory that was generated by the short-term trajectory generating unit having the shortest operation cycle, next, the vehicle is controlled with a short-term trajectory made with reference to the medium-term trajectory that was generated by the medium-term trajectory generating unit having the next shortest operation cycle, and next, the vehicle is controlled with a short-term trajectory made with reference to the medium-term trajectory that was generated with reference to the long-term trajectory that was generated by the long-term trajectory generating unit having the longest operation cycle. Therefore, automated driving can be started immediately, and a transition can be made gradually (in a stepwise manner) to automated driving which is implemented in consideration of riding comfort (comfortableness).

A trajectory generating method in a vehicle control device according to the present invention is a trajectory generating method in a vehicle control device that controls a vehicle configured to be driven automatically, the vehicle control device comprising a recognition result receiving unit configured to receive external environment recognition information around a periphery of a host vehicle, an environment map generating unit configured to receive the external environment recognition information, and generate an environment map as information indicative of a situation around the periphery of the host vehicle, a trajectory generating unit to which the environment map is input, and which is configured to generate a trajectory on a basis of the environment map, and an automated driving ON setting unit configured to set automated driving to an ON state, wherein the trajectory generating method comprises a step of determining whether or not the automated driving ON setting unit is set to the ON state, a step of controlling the vehicle on a basis of the trajectory generated by the trajectory generating unit, when the automated driving is set to the ON state by the automated driving ON setting unit, and a step of not controlling the vehicle, but performing generation of the trajectory by the trajectory generating unit, when the automated driving is not set to the ON state.

In accordance with the method of the invention, it is possible for automated driving to be initiated on the basis of a trajectory that is generated from a point in time immediately after automated driving has been turned ON.

An apparatus invention corresponding to such a method invention is also included within the scope of the present invention.

DESCRIPTION OF EMBODIMENTS

A preferred embodiment of a vehicle control device according to the present invention will be presented and described below with reference to the accompanying drawings, in relation to a vehicle in which the vehicle control device is installed.

[Configuration of Vehicle 10]

Figure 1:
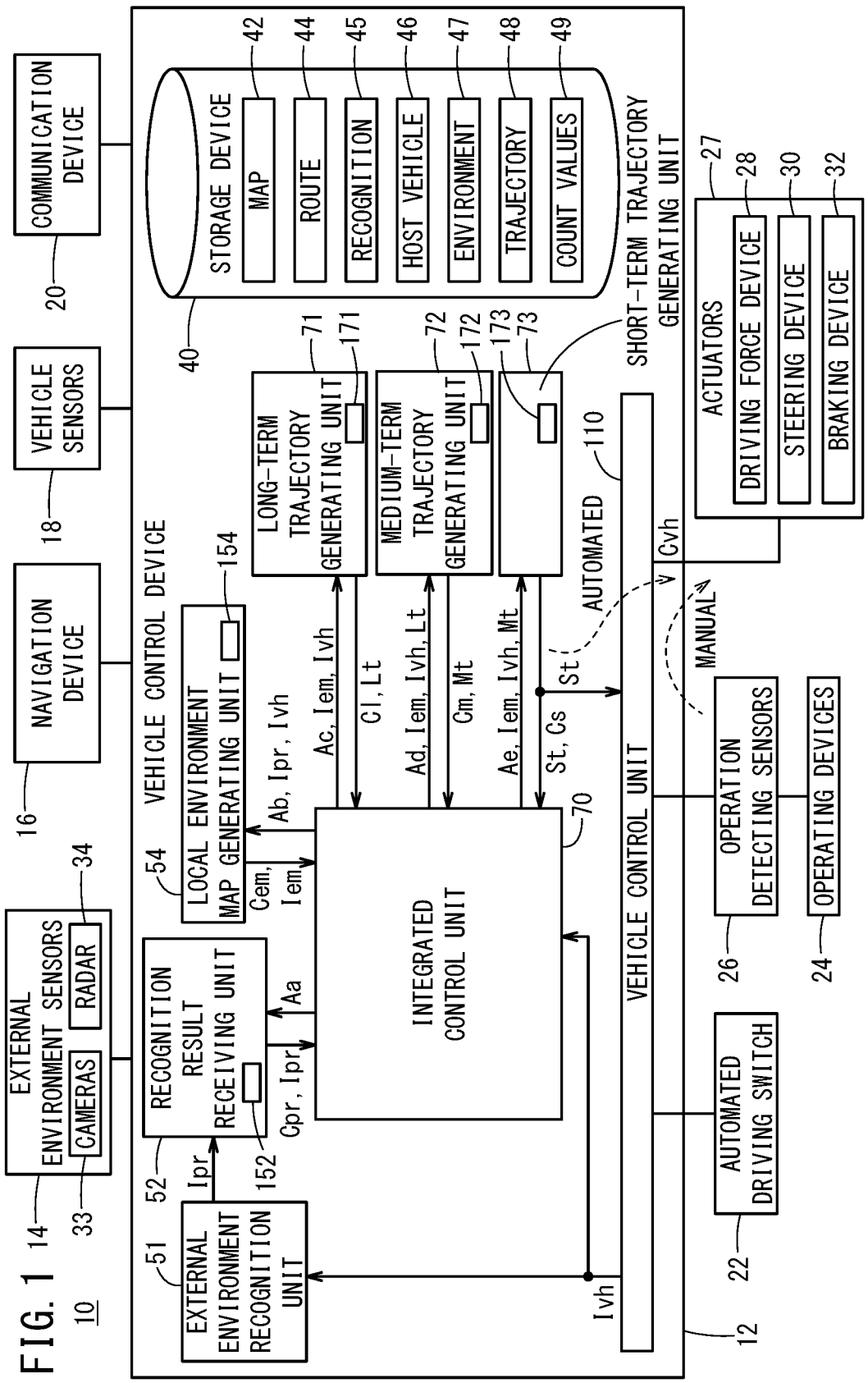
FIG. 1 is a schematic configuration block diagram of a vehicle equipped with a vehicle control device according to a present embodiment.

FIG. 1 is a schematic configuration block diagram of a vehicle 10 (also referred to as a "host vehicle" or a "driver's own vehicle") equipped with a vehicle control device 12 according to a present embodiment.

The vehicle 10 includes the vehicle control device 12, and in addition to the vehicle control device 12, is equipped with input devices and output devices which are connected via communication lines to the vehicle control device 12.

As the input devices, there are provided external environment sensors 14, a navigation device 16, vehicle sensors 18, a communication device 20, an automated driving switch 22, and operation detecting sensors 26 connected to operating devices 24.

As the output devices, there are provided a driving force device 28 for driving the vehicle wheels (not shown), a steering device 30 for steering the vehicle wheels, and a braking device 32 for braking the vehicle wheels. Moreover, the navigation device 16 and the communication device 20 can also be used as input/output devices (human interface, transceiver).

[Configuration of Input/Output Devices Connected to Vehicle Control Device 12]

The external environment sensors 14 include a plurality of cameras 33 and a plurality of radar devices 34 which acquire information indicative of the external environment (360° around the front, rear, and sides, etc.) of the vehicle 10, and output the acquired external environmental information of the vehicle 10 to the vehicle control device 12. The external environment sensors 14 may further be equipped with a plurality of LIDAR (Light Detection and Ranging; Laser Imaging Detection and Ranging) devices.

The navigation device 16 detects and specifies a current position of the vehicle 10 using a satellite positioning device or the like, together with including a touch panel display, a speaker, and a microphone as a user interface, and further, calculates a route to a designated destination from the current position or a position designated by the user, and outputs the calculated route to the vehicle control device 12. The route calculated by the navigation device 16 is stored as route information in a route information storage unit 44 of a storage device 40.

The vehicle sensors 18 output to the vehicle control device 12 detection signals from respective sensors, including a velocity (vehicle velocity) sensor for detecting the velocity (vehicle velocity), an acceleration sensor for detecting an acceleration, and a lateral G sensor for detecting a lateral G force of the vehicle 10, a yaw rate sensor for detecting an angular velocity about a vertical axis of the vehicle 10, an orientation sensor for detecting an orientation of the vehicle 10, and a gradient sensor for detecting a gradient of the vehicle 10. At each of respective operation cycles Toc, to be described later, the detection signals are stored as host vehicle state information Ivh of the host vehicle in a host vehicle state information storage unit 46 of the storage device 40.

The communication device 20 communicates with roadside devices, other vehicles, and a server, etc., and receives or transmits information related to traffic signals, etc., information related to the other vehicles, as well as probe information and updated map information or the like. In addition to being stored in the navigation device 16, the map information is stored as map information in a map information storage unit 42 of the storage device 40.

The operating devices 24 include an accelerator pedal, a steering wheel (handle), a brake pedal, a shift lever, and a direction indicating (turn signal) lever, and the like. The operation detecting sensors 26, which detect the presence or absence or the operated amounts of operations made by the driver, as well as operated positions, are attached to the operating devices 24.

The operation detecting sensors 26 output to a vehicle control unit 110 as detection results an amount by which the accelerator is depressed (degree of accelerator opening), an amount (steering amount) at which the steering wheel is operated, an amount by which the brake pedal is depressed, a shift position, and a right or left turn direction, etc.

The automated driving switch 22 (automated driving ON setting unit), for example, is a pushbutton switch provided on the instrument panel, and is operated manually by a user such as a driver or the like in order to switch between a non-automated driving mode (manual driving mode) and an automated driving mode.

According to the present embodiment, the automated driving mode and the non-automated driving mode are set each time that the pushbutton switch is pressed, however, in order to provide confirmation of a driver's intention to switch to automated driving, it is possible to provide settings in which, for example, switching from the non-automated driving mode to the automated driving mode is effected by pressing twice, and switching from the automated driving mode to the non-automated driving mode is effected by pressing once.

The automated driving mode is a driving mode in which the vehicle 10 travels under the control of the vehicle control device 12, in a state in which the driver does not operate the operating devices 24 such as the accelerator pedal, the steering wheel, and the brake pedal, and is a driving mode in which the vehicle control device 12 controls a portion or all of the driving force device 28, the steering device 30, and the braking device 32 on the basis of action plans (a short-term trajectory St, a medium-term trajectory Mt, and a long-term trajectory Lt, to be described later).

Moreover, during the automated driving mode, in the case that the driver starts to operate any of the operating devices 24 such as the accelerator pedal, the steering wheel, or the brake pedal, the automated driving mode is canceled automatically, and the system switches over to the non-automated driving mode (manual driving mode).

In this instance, even in the manual driving mode, certain driving assist functions, such as a known adaptive cruise control (ACC) function, and a lane keeping assist system (LKAS) function can be implemented.

Further, the aforementioned automated driving switch 22 may be of a touch type, a voice input type, or the like.

The driving force device 28 is constituted from a driving force ECU, and a drive source for the vehicle 10 such as an engine and/or a traction motor or the like. The driving force device 28 generates a travel driving force (torque) in order for the vehicle 10 to travel in accordance with vehicle control values Cvh input thereto from the vehicle control unit 110, and transmits the travel driving force to the vehicle wheels directly or through a transmission.

The steering device 30 is constituted from an EPS (electric power steering system) ECU, and an EPS device. The steering device 30 changes the orientation of the vehicle wheels (steered wheels) in accordance with the vehicle control values Cvh input thereto from the vehicle control unit 110.

The braking device 32, for example, is an electric servo brake used in combination with a hydraulic brake, and is made up from a brake ECU and a brake actuator.

The braking device 32 brakes the vehicle wheels in accordance with vehicle control value Cvh information input thereto from the vehicle control unit 110.

Moreover, steering of the vehicle 10 can also be performed by changing a torque distribution and/or a braking force distribution with respect to the left and right vehicle wheels.

[Configuration of Vehicle Control Device 12]

The vehicle control device 12 is constituted by one or a plurality of ECUs (electronic control units), and is equipped with the storage device 40, etc., in addition to various function realizing units. According to the present embodiment, the function realizing units are software-based functional units, in which the functions thereof are realized by a CPU (central processing unit) executing programs stored in the storage device 40. However, the functions thereof can also be realized by hardware-based functional units made up from integrated circuits or the like.

Figure 2:
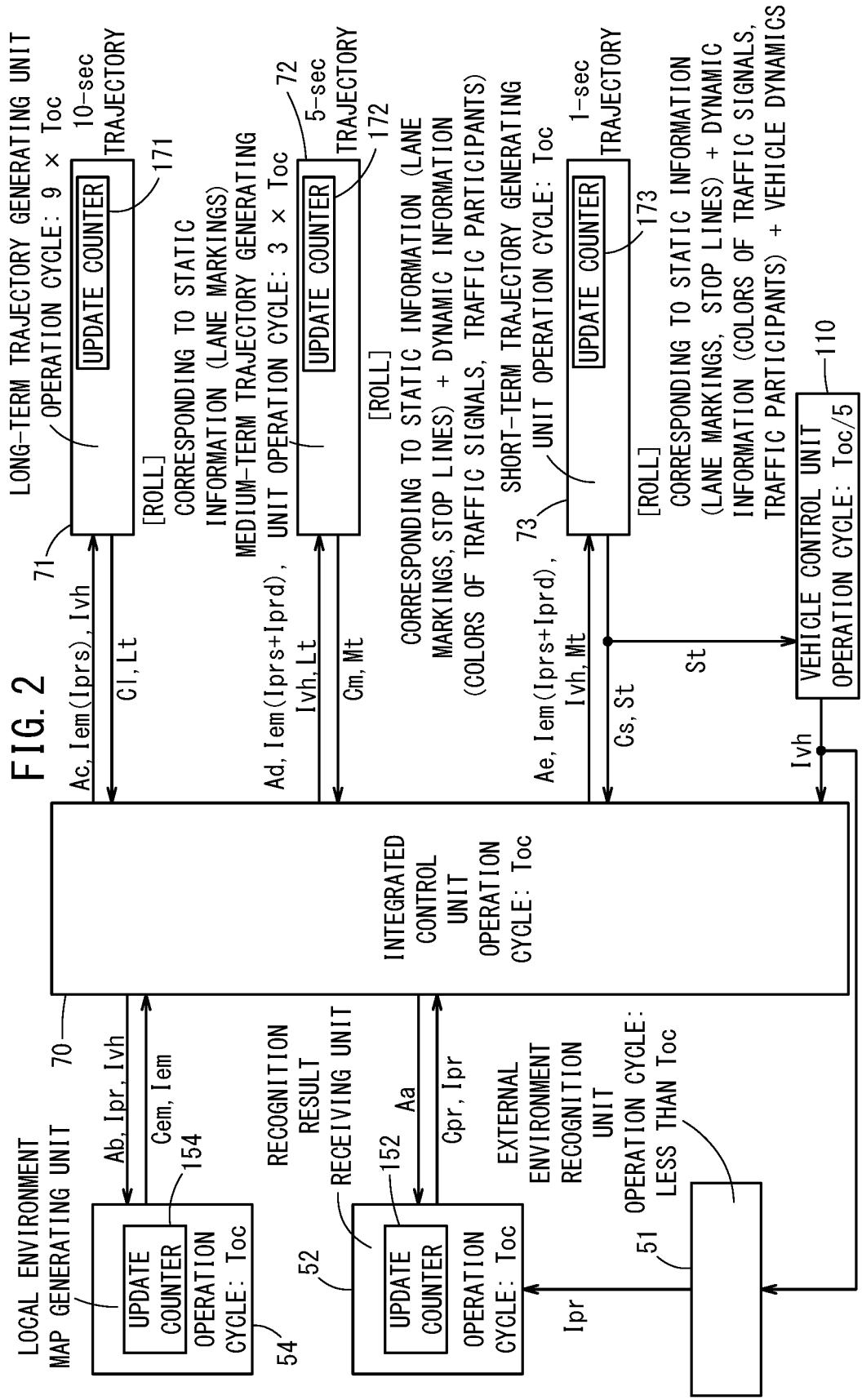
FIG. 2 is a block diagram in which the configuration of principle components appearing in FIG. 1 is extracted.

FIG. 2 is a block diagram extracted from FIG. 1 and showing the configuration of principle components of the vehicle control device 12 according to the present embodiment.

In addition to the storage device 40 (see FIG. 1) and the vehicle control unit 110 as a function realizing unit (function realizing module), the vehicle control device 12 includes an external environment recognition unit 51, a recognition result receiving unit 52, a local environment map generating unit 54, a long-term trajectory generating unit 71, a medium-term trajectory generating unit 72, a short-term trajectory generating unit 73, and an integrated control unit (task synchronization module) 70 that controls these units comprehensively together with controlling task synchronization.

In this instance, respective update counters 152, 154, 171, 172, and 173 are provided as counters that are updated for each of the processes that take place in the respective operation cycles in the recognition result receiving unit 52, the local environment map generating unit 54, the long-term trajectory generating unit 71, the medium-term trajectory generating unit 72, and the short-term trajectory generating unit 73.

Moreover, according to the present embodiment, the operation cycles of the recognition result receiving unit 52, the local environment map generating unit 54, and the short-term trajectory generating unit 73 are the same operation cycle Toc as that of the integrated control unit 70, the medium-term trajectory generating unit 72 has an operation cycle of 3×Toc that is three times the operation cycle Toc, and the long-term trajectory generating unit 71 has an operation cycle of 9×Toc that is nine times the operation cycle Toc, however, the operations cycles thereof can be adjusted or changed as appropriate.

Moreover, the operation cycle Toc is a standard operation cycle in the vehicle control device 12, and is set, for example, to a value on the order of several tens of ms.

The count values (updated count values), which are the count values of each of the update counters 152, 154, 171, 172, and 173, are used by the integrated control unit 70 in order to confirm whether or not the respective units of the recognition result receiving unit 52, the local environment map generating unit 54, the long-term trajectory generating unit 71, the medium-term trajectory generating unit 72, and the short-term trajectory generating unit 73 are operating normally.

The count values Cpr, Cem, Cl, Cm, and Cs which are updated by the update counters 152, 154, 171, 172, and 173 are stored in an updated count value storage unit 49 of the storage device 40 (see FIG. 1).

In the vehicle control device 12, the external environment recognition unit 51 simultaneously generates external environment recognition information Ipr made up from static (having no change or no movement) external environment recognition information Iprs, and dynamic (in which change or movement thereof is possible) external environment recognition information Iprd.

When the static external environment recognition information Iprs is generated, the external environment recognition unit 51 refers to the host vehicle state information Ivh from the vehicle control unit 110, and furthermore, from among the external environment sensors 14, on the basis of the external environmental information (image information) from the cameras 33 and the like, recognizes lane markings (white lines) on both sides of the vehicle 10, together with recognizing the distances to stop lines of intersections or the like (how many meters there are up to the stop lines) as well as recognizing travel capable regions (planar regions in which guardrails and curbsides are excluded without concern to the lane markings), and then generates the external environment recognition information Iprs, and transmits (outputs) such information to the recognition result receiving unit 52.

When the dynamic external environment recognition information Iprd is generated, the external environment recognition unit refers to the host vehicle state information Ivh, and furthermore, on the basis of the external environmental information from the cameras 33 or the like, the external environment recognition unit 51 recognizes obstacles (including parked or stopped vehicles), traffic participants (people, other vehicles), and the colors of traffic signals (blue (green), yellow (orange), red) and the like, and then generates the external environment recognition information Iprd, and transmits (outputs) such information to the recognition result receiving unit 52.

The external environment recognition unit 51 recognizes the external environment recognition information Ipr (Ipr=Iprs+Iprd) in a time period that is less than the operation cycle Toc, and transmits (outputs) the information to the recognition result receiving unit 52.

In this case, the recognition result receiving unit 52 updates the count value Cpr of its own update counter 152 in response to an operation command Aa from the integrated control unit 70, and outputs the updated count value Cpr together with the external environment recognition information Ipr (Ipr=Iprs+Iprd) to the integrated control unit 70 within the operation cycle Toc.

The integrated control unit 70 stores the external environment recognition information Ipr (Ipr=Iprs+Iprd) and the count value Cpr in the storage device 40.

In response to an operation command Ab from the integrated control unit 70, the local environment map generating unit 54 refers to (aggregates) the host vehicle state information Ivh as well as the external environment recognition information Ipr, and inside of the operation cycle Toc, generates local environment map information Iem, and outputs the information to the integrated control unit 70 together with the count value Cem of the update counter 154.

More specifically, at the start of the control, an operation cycle 2× Toc is required until the local environment map information Iem is generated.

The local environment map information Iem, in general, is information obtained by synthesizing the host vehicle state information Ivh with the external environment recognition information Ipr. The local environment map information Iem is stored in a local environment map information storage unit 47 of the storage device 40.

Figure 3:
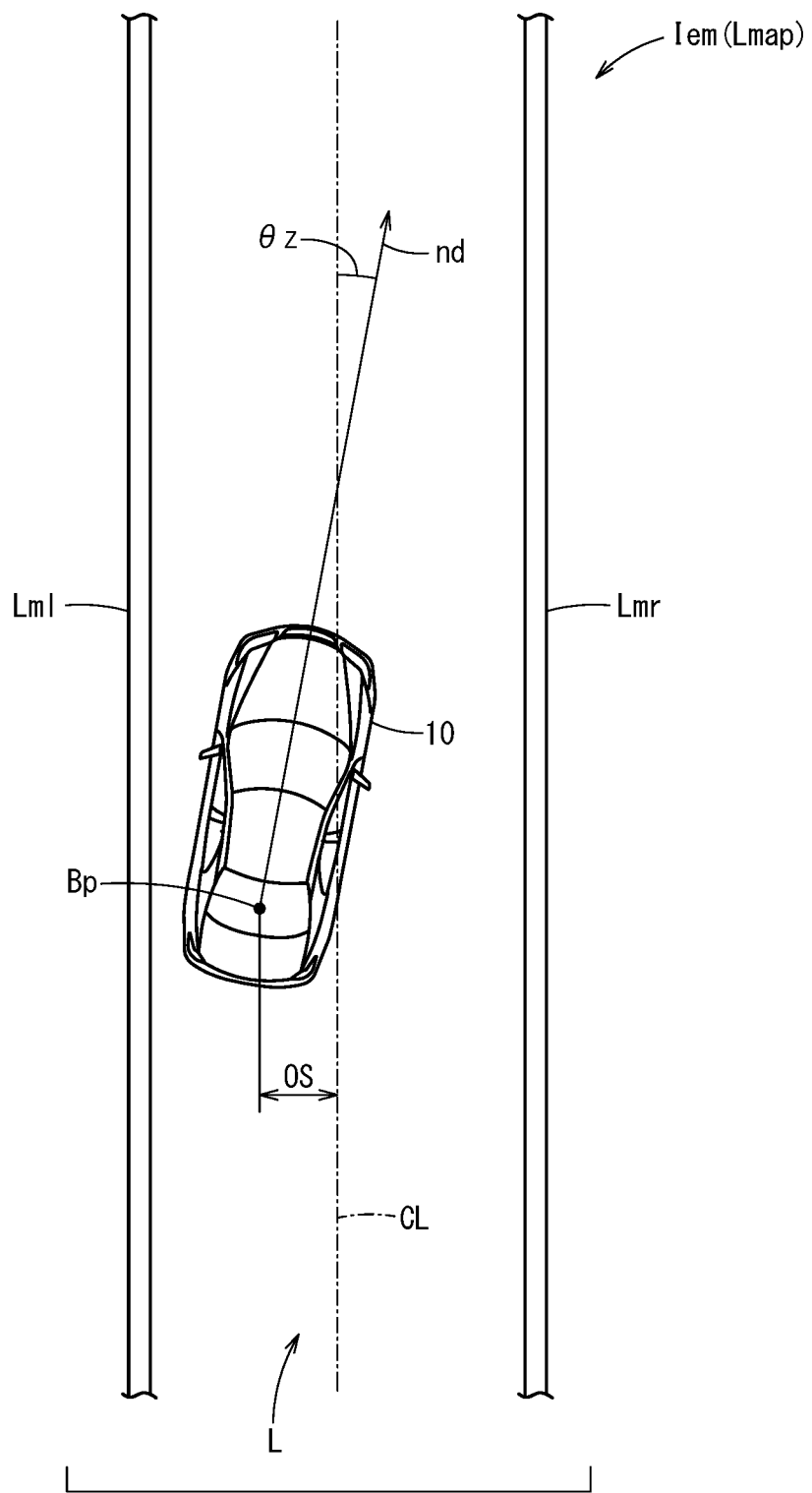
FIG. 3 is an exemplary illustration of a local environment map.

FIG. 3 shows an example of a local environment map Lmap that is stored as the local environment map information Iem.

In this instance, the host vehicle state information Ivh is information obtained from the vehicle control unit 110, and is basically made up from an offset amount (position) OS of a reference point Bp of the vehicle 10, for example, a midpoint of a rear wheel axle from a center line CL of the lane L (which is partitioned by a right side lane marking Lmr and a left side lane marking Lml), a posture angle (also referred to as an azimuth angle) θz which is an angle between the center line CL and a nose direction nd of the vehicle 10, a velocity vs, an acceleration va, a curvature ρ of the travel line, a yaw rate γ, and a steering angle δst, etc. The offset amount OS may be expressed as coordinates {x (a longitudinal direction which is the direction of the travel path), y (a lateral direction which is a direction perpendicular to the travel path)} from a reference position (arbitrary).

More specifically, as shown in the following equation (1), the host vehicle state information Ivh is the most recent information at that point in time of a later-described trajectory point sequence Pj {refer to equation (2)}.

$$Ivh = Ivh(x, y, \theta z, vs, va, \rho, \gamma, \delta st) \quad (1)$$

$$Pj = Pj(x, y, \theta z, vs, va, \rho, \gamma, \delta st), t = 1, 2, \ldots T \quad (2)$$

The trajectory point sequence Pj is corrected until later-described trajectory point sequence candidates Pcj(x, y, θz, vs, va, ρ, γ, δst) t=1, 2, . . . T are affirmatively evaluated, to result in the trajectory point sequence Pj(x, y, θz, vs, va, ρ, γ, δst) t=1, 2, . . . T which is an output trajectory. The term "t" corresponds to the time of an integer fraction (which may be changed depending on the velocity vs) of the operation cycle Toc, with 1 being a first point, and T corresponding to the length of time of the trajectory that is generated at a point of one second or the like.

In FIG. 3, the lane L (the right lane marking Lmr and the left lane marking Lml) is the external environment recognition information Ipr that is recognized (using a known type of lane marking detection, a bird's-eye transformation, and a curve approximation process) by the external environment recognition unit 51 from the image information from the cameras 33.

In this manner, the local environment map information Iem (local environment map Lmap) is information indicative of the surrounding situation (a situation around the periphery of the host vehicle) of the road (lane markings Lm) with the vehicle position in the direction in which the host vehicle 10 is traveling serving as a reference, which is generated by combining the host vehicle state information Ivh and the external environment recognition information Ipr.

Moreover, in the local environment map generating unit 54, for example, in the case of a straight lane, the lane center line CL is generated as an optimum travel line, and in the case of a curved lane, a so-called out-in-out travel line with respect to the lane center line CL is generated as the optimum travel line. Such an optimum travel line is included in the local environment map information Iem (local environment map Lmap).

Returning to FIG. 2, in response to an operation command Ac from the integrated control unit 70, the long-term trajectory generating unit 71 refers to the local environment map information Iem including the static external environment recognition information Iprs from which the dynamic external environment recognition information Iprd is excluded, the host vehicle state information Ivh, and a road map (curvatures of curbsides and the like) which is stored in the map information storage unit 42, generates a long-term trajectory Lt, for example, with an operation cycle of 9×Toc, and outputs the generated long-term trajectory Lt to the integrated control unit 70 together with the count value Cl of the update counter 171. The long-term trajectory Lt is stored as trajectory information It in a trajectory information storage unit 48 of the storage device 40.

More specifically, the long-term trajectory generating unit 71 generates a long-term trajectory (also referred to as a 10-sec trajectory) Lt corresponding to a relatively long time period (long distance), for example, a travel time on the order of 10 seconds, which is a trajectory for the purpose of carrying out a vehicle control in which emphasis is placed on riding comfort and comfortability of the vehicle 10 (in which rapid steering and rapid acceleration/deceleration are not performed), and for example, corresponds to a trajectory that is driven by a model driver who is skilled at driving, and which uses the static external environment recognition information Iprs without using the dynamic external environment recognition information Iprd, and in which the operation cycle is of a relatively long period taking place, for example, over a long period Tl (Tl=9×Toc) on the order of several hundred ms.

In response to an operation command Ad from the integrated control unit 70, the medium-term trajectory generating unit 72 refers to the local environment map information Iem (including the dynamic external environment recognition information Iprd and the static external environment recognition information Tprs), the host vehicle state information Ivh, and the long-term trajectory Lt, generates a medium-term trajectory Mt with an operation cycle of 3× Toc, and outputs the generated medium-term trajectory Mt to the integrated control unit 70 together with the count value Cm of the update counter 172. The medium-term trajectory Mt is stored as trajectory information It in the trajectory information storage unit 48.

For example, in the case that the external environment recognition unit 51 has discovered an obstacle (included in the dynamic external environment recognition information Iprd) such as a parked vehicle or the like in a frontward direction of the lane L, the medium-term trajectory generating unit 72 generates the medium-term trajectory (also referred to as a 5-sec trajectory) Mt corresponding to a relatively short time period (short distance), for example, a travel time on the order of several seconds, which is a trajectory (in the case of multiple lanes on one side, a trajectory including a lane change if necessary) for bypassing the parked vehicle or the like, and in which the operation cycle is of a relatively shorter period than the long period Tl taking place, for example, over a medium period Tm (Tm=3×Toc) on the order of one hundred and several tens of ms.

When the medium-term trajectory Mt is generated, in the case that the dynamic environment recognition information Iprd is not included within the local environment map information Iem, as a result, the medium-term trajectory Mt substantially coincides with the long-term trajectory Lt.

In response to an operation command Ae from the integrated control unit 70, the short-term trajectory generating unit 73 refers to the medium-term trajectory Mt that was generated with reference to the local environment map information Iem (including the dynamic external environment recognition information Iprd and the static external environment recognition information Iprs), the host vehicle state information Ivh, and the long-term trajectory Lt, generates a short-term trajectory St corresponding to the vehicle dynamics of the host vehicle 10 and with the shortest operation cycle Toc from among the three trajectory generating units, and together with the count value Cs of the update counter 173, outputs the generated short-term trajectory St to the integrated control unit 70, and simultaneously outputs the same to the vehicle control unit 110.

The vehicle control unit 110 controls actuators 27 on the basis of the short-term trajectory St. The short-term trajectory St is stored as trajectory information It in the trajectory information storage unit 48.

When the short-term trajectory St is generated, in the case that the dynamic environment recognition information Iprd is not included within the local environment map information Iem, as a result, the short-term trajectory St substantially coincides with the medium-term trajectory Mt that was generated with reference to the long-term trajectory Lt.

In this manner, the short-term trajectory generating unit 73 generates the short-term trajectory (referred to as a 1-sec trajectory) St corresponding to a relatively short time period (short distance) to be traveled henceforth, for example, a travel time on the order of one second, in which the operation cycle is of a relatively shorter period than the long period Tl and the medium period Tm, and takes place, for example, over a short period Ts (Ts=Toc) on the order of several tens of ms.

As the short-term trajectory St, for each short period Ts, there is generated a trajectory point sequence Pj(x, y, θz, vs, va, δst) as vehicle command values, generally on the basis of the position x in the longitudinal direction along the center line CL of the lane markings, the position y in the lateral direction, the posture angle θz, the velocity vs, the acceleration va, and the steering angle δst (the steering angle δ of the vehicle 10 can be calculated in consideration of a gear ratio to the steering angle δst of the steering wheel), etc., {refer to the above-described equation (2)}.

In practice, before a final trajectory point sequence Pj is generated, a plurality of trajectory point sequence candidates Pcj (operation cycle: about Toc/5) are generated by the short-term trajectory generating unit 73 in each of the short periods Ts (Ts=Toc). As will be described later, concerning the generated trajectory point sequence candidates Pcj, within the same short period Ts, the trajectories are further evaluated by the short-term trajectory generating unit 73 on the basis of the vehicle dynamics, and thereafter, according to the evaluation results, corrections are made if necessary, and the trajectory point sequence Pj is generated as the output trajectory of the short-term trajectory St.

The vehicle control unit 110 converts the trajectory point sequence Pj into the vehicle control values Cvh, and outputs the values to the driving force device 28, the steering device 30, and the braking device 32, in a manner so that the vehicle 10 travels along the input short-term trajectory St, and more specifically, along the trajectory point sequence Pj that was generated and input on the order of the operation cycle Toc/5.

Moreover, the set time lengths (also referred to as time trajectories) of the short-term trajectory St, the medium-term trajectory Mt, and the long-term trajectory Lt may be changed depending on the velocity vs, the steering angle δt, the curvature ρ of the travel line, the road gradient, and the like.

Description of Operations of the Embodiment

[Description According to the Flowchart]

Figure 4:
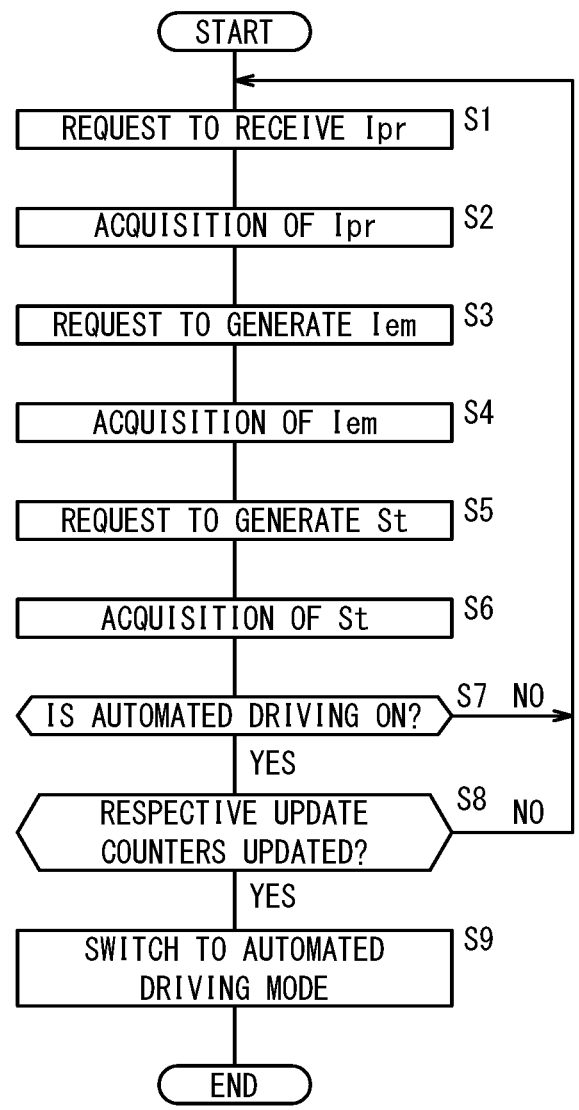
FIG. 4 is a flowchart provided to explain operations of the vehicle control device.

Operations of the vehicle control device 12, which is basically configured in the manner described above, will be described in detail with reference to the flowchart of FIG. 4.

The execution subject of the program according to the flowchart is the integrated control unit 70 of the vehicle control device 12.

In step S1, the integrated control unit 70 transmits with respect to the recognition result receiving unit 52 the operation command Aa to request reception of the external environment recognition information Ipr.

In this case, in a time period that is less than the operation cycle Toc, and on the basis of the external environmental information (image information) from the cameras 33 from among the external environment sensors 14, the external environment recognition unit 51 recognizes the lane markings Lm (Lmr, Lml) on both sides (right and left sides) of the vehicle 10, and together therewith, generates the static external environment recognition information Iprs of features such as the position up to a stop line of an intersection or the like, and the travel capable region (a region in which guardrails and curbsides are excluded), etc., and transmits the information to the recognition result receiving unit 52.

Simultaneously, on the basis of the external environmental information from the cameras 33, the radar devices 34, and the non-illustrated LIDAR devices or the like, the external environment recognition unit 51 generates the dynamic external environment recognition information Iprd of features such as obstacles (including parked or stopped vehicles), traffic participants (people, other vehicles), and the colors of traffic signals, etc., and transmits the information to the recognition result receiving unit 52.

Therefore, in step S2, the static external environment recognition information Iprs (for example, mainly road partition lines such as lane markings, stop lines, and curbsides) and the dynamic external environment recognition information Iprd (for example, mainly colors of traffic signals, and traffic participants) are acquired in synchronism with the operation command Aa as the external environment recognition information Ipr by the integrated control unit 70 through the recognition result receiving unit 52 together with the count value Cpr of the update counter 152, and such information is stored in the storage device 40.

In step S3, in synchronism with the next operation cycle Toc, the integrated control unit 70 transmits with respect to the local environment map generating unit 54 the external environment recognition information Ipr and the host vehicle state information Ivh, and together therewith, transmits the operation command Ab to request generation of the local environment map information Iem.

In synchronism with the operation command Ab, and within the operation cycle Toc, the local environment map generating unit 54 combines (merges) the host vehicle state information Ivh with the external environment recognition information Ipr, generates the local environment map information Iem including the local environment map Lmap shown in FIG. 3, and transmits the generated local environment map information Iem together with the updated count value Cem of the update counter 154 to the integrated control unit 70.

Consequently, in step S4, the integrated control unit 70 acquires the local environment map information Iem (step S4), and stores the local environment map information Iem in the storage device 40.

Next, in step S5, in synchronism with the next operation cycle Toc, the integrated control unit 70 transmits with respect to the short-term trajectory generating unit 73 the external environment recognition information Ipr, the host vehicle state information Ivh, and the local environment map information Iem, and together therewith, transmits the operation command Ae to request generation of the short-term trajectory St.

In synchronism with the operation command Ae, the short-term trajectory generating unit 73 sets to an initial value (initial position) the previously output short-term trajectory St, and based on the initial value (initial position), with reference to the host vehicle state information Ivh and the local environment map information Iem, generates the trajectory point sequence candidates Pcj including a nose direction (longitudinal direction x) nd at each ⅕ of the operation cycle Toc (the operation cycle Toc divided by 5), and position coordinates (x, y) of the reference point Bp (FIG. 3) of the vehicle 10 in a direction (lateral direction y) perpendicular to the nose direction nd.

The short-term trajectory generating unit 73, while taking into consideration the vehicle dynamics in light of the local environment map information Iem, evaluates whether the trajectories of the generated trajectory point sequence candidates Pcj, for example, are capable of enabling passage through an intersection in the case that the light color of the traffic signal is green, or are capable of enabling stopping at a stop line before reaching the intersection in the case that the light color of the traffic signal is red, or the like, corrects the trajectory point sequence candidates Pcj until the evaluation result thereof becomes an affirmative evaluation, and generates the trajectory point sequence Pj which is the output trajectory. The generated trajectory point sequence Pj is transmitted to the integrated control unit 70 and the vehicle control unit 110.

The vehicle control unit 110 converts the trajectory point sequence Pj into the vehicle control values Cvh and transmits them to the actuators 27 (the driving force device 28, the steering device 30, and the braking device 32).

In step S6, the short-term trajectory St made up from the trajectory point sequence Pj, and the updated count value Cs of the update counter 173 are acquired by the integrated control unit 70, and are stored as trajectory information It in the trajectory information storage unit 48, and together therewith, the count value Cs is stored in the updated count value storage unit 49.

Next, in step S7, the integrated control unit 70 determines whether or not the automated driving switch 22 is set to an on-state automated driving mode.

In the case that the automated driving switch 22 is set to an off-state non-automated driving mode (step S7: NO), the process of generating the short-term trajectory St of step S1 and thereafter is repeated.

In the case that the automated driving switch 22 is set to the on-state automated driving mode (step S7: YES), then in step S8, it is confirmed whether or not the count values Cpr, Cem, Cl, Cm, and Cs of the respective update counters 152, 154, 171, 172, and 173 have been updated, and in the case of not being updated (in the case of a deviation in time), the process returns to step S1, whereas in the case of being updated, then in step S9, a switch is instantly made to the automated driving mode {also referred to as transitioning (switching over) from the non-automated driving mode to the automated driving mode}.

[Description in Accordance with Time Chart (Until Initiation of Automated Driving by Short-Term Trajectory St)]

Next, with reference to the time chart of FIG. 5, an operation of transitioning from the non-automated driving mode (manual driving mode) to the automated driving mode, and operations of the vehicle control device 12 in the automated driving mode will be described.

Figure 5:
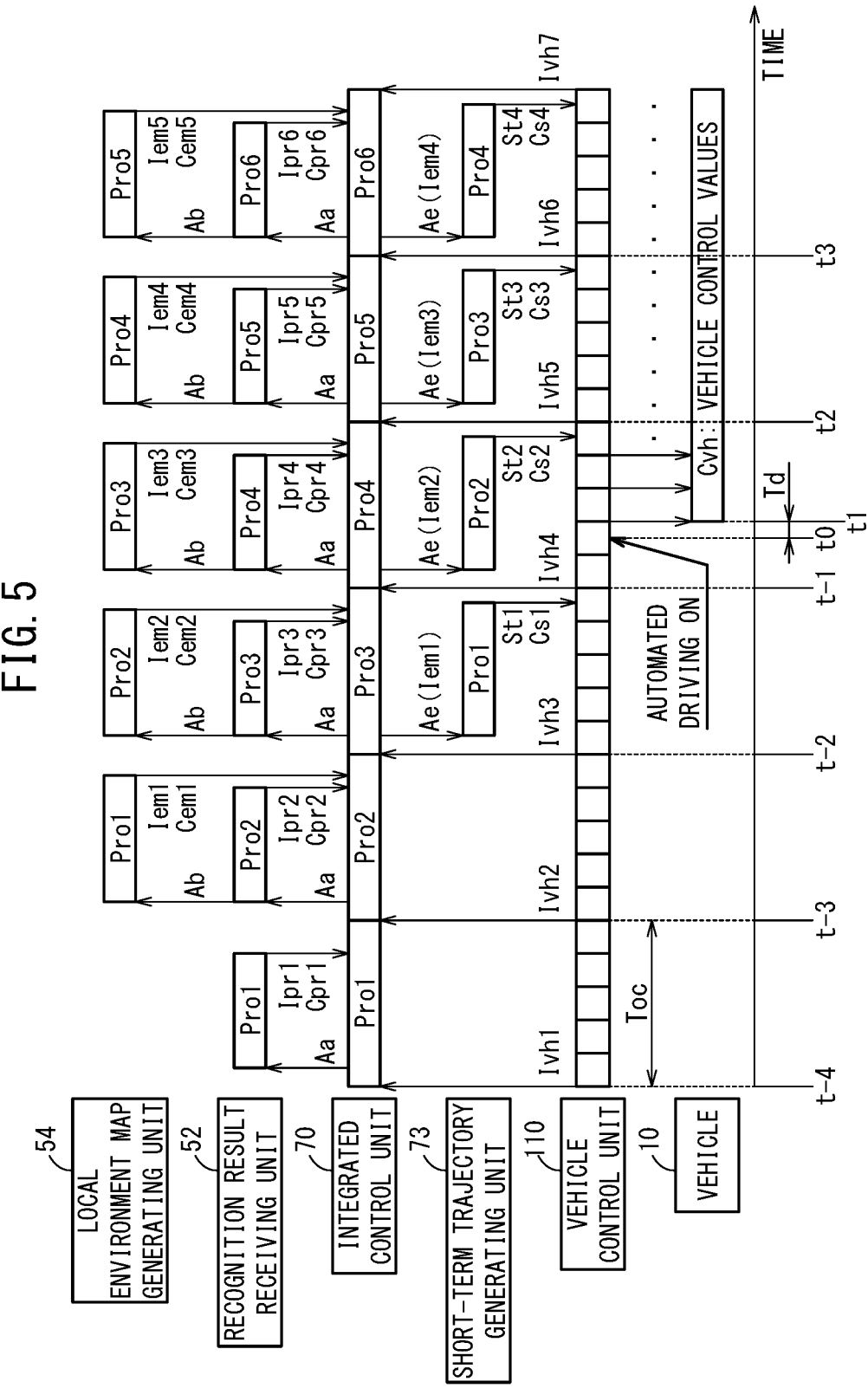
FIG. 5 is a time chart provided to explain operations of the vehicle control device in the vicinity of initiation of automated driving according to the present embodiment.

In FIG. 5, at time t0, the manual driving mode (automated driving OFF state) is switched to the automated driving mode (automated driving ON state) by an operation of the automated driving switch 22 made by the driver or the like.

At time t-4 prior to time t0 (a point in time at the leftmost end in FIG. 5), the integrated control unit 70 receives the host vehicle state information Ivh1 from the vehicle control unit 110, and stores the host vehicle state information Ivh1 in the host vehicle state information storage unit 46. Further, in the vicinity of initiation of its own process Pro1 corresponding to the operation cycle Toc, the integrated control unit 70 transmits to the recognition result receiving unit 52 (see FIGS. 1 and 2) the operation command Aa to request reception of the external environment recognition information Ipr1 (corresponding to step S1).

In response to the operation command Aa, within the operation cycle Toc, the recognition result receiving unit 52 receives the external environment recognition information Ipr1 from the external environment recognition unit 51 in its own process Pro1 up to time t-3 before the start of the next calculation period Toc, and outputs the received external environment recognition information Ipr1 and the count value Cpr1 that was updated by the update counter 152 to the integrated control unit 70 (corresponding to step S2). At that point in time t-3, the integrated control unit 70 stores the acquired external environment recognition information Ipr1 in an external environment recognition information storage unit 45, together with storing the count value Cpr1 in the updated count value storage unit 49.

At time t-3, the integrated control unit 70 receives the host vehicle state information Ivh2 from the vehicle control unit 110, and stores the host vehicle state information Ivh2 in the host vehicle state information storage unit 46. Further, the integrated control unit 70, in the vicinity of initiation of its own process Pro2, transmits to the recognition result receiving unit 52 the operation command Aa to request reception of the external environment recognition information Ipr2, and together therewith, simultaneously transmits to the local environment map generating unit 54 the operation command Ab to request generation of the local environment map information Iem1 (corresponding to step S3).

In this case, within the calculation period Toc, the recognition result receiving unit 52 receives from the external environment recognition unit 51 the external environment recognition information Ipr2, which was generated by the external environment recognition unit 51 in the process Pro2 prior to time t-2 at the start of the next calculation period Toc, and outputs the external environment recognition information Ipr2 to the integrated control unit 70 together with the updated count value Cpr2. Furthermore, in response to the operation command Ab at time t-3, the local environment map generating unit 54 generates the local environment map information Iem1 by the process Pro1 substantially within the time period of the operation cycle Toc, and by time t-2, outputs the local environment map information Iem1 to the integrated control unit 70 together with the count value Cem1.

Moreover, the local environment map information Iem1 is combined information of the external environment recognition information Ipr1 and the host vehicle state information Ivh2, is acquired by the integrated control unit 70, and is stored in the external environment recognition information storage unit 45 (corresponding to step S4).

The count value (updated count value) Cpr2 and the count value Cem1 are stored in the updated count value storage unit 49 in the process Pro2 of the integrated control unit 70.

At the start of the process Pro3 at time t-2, the integrated control unit 70 receives the host vehicle state information Ivh3 from the vehicle control unit 110, and stores the host vehicle state information Ivh3 in the host vehicle state information storage unit 46.

Further, the integrated control unit 70, in the vicinity of initiation of the process Pro3 that is started from time t-2, transmits to the recognition result receiving unit 52 the operation command Aa to request reception of the external environment recognition information Ipr2, and together therewith, transmits to the local environment map generating unit 54 the operation command Ab to request generation of the local environment map information Iem2, and simultaneously transmits with respect to the short-term trajectory generating unit 73 the operation command Ae to request generation of the short-term trajectory St1 (corresponding to step S5).

In response to the operation command Ae at time t-2, at a time within the operation cycle Toc of its own process Pro1, the short-term trajectory generating unit 73 generates a short-term trajectory St1, which is made up from the aforementioned trajectory point sequence Pj using the host vehicle state information Ivh3 and the local environment map information Iem2, and immediately prior to time t-1, outputs the generated short-term trajectory St1 to the integrated control unit 70 and the vehicle control unit 110. The count value Cs1 of the update counter 173 is also output from the short-term trajectory generating unit 73 to the integrated control unit 70.

The short-term trajectory St1 acquired (received) by the integrated control unit 70 (corresponding to step S6) is stored in the trajectory information storage unit 48, and the count value Cs1 is stored in the updated count value storage unit 49.

The integrated control unit 70, which has detected the transition to the ON state of the automated driving switch 22 at time t0 within the operation cycle Toc starting from time t-1 (corresponding to step S7: YES), at that point in time t0, transmits to the vehicle control unit 110 the trajectory point sequence Pj of the short-term trajectory St1 immediately prior to its being capable of use.

The vehicle control unit 110 converts the trajectory point sequence Pj into vehicle control values Cvh at a processing time period (required time period) Td from the time t0 of transitioning to the ON state of the automated driving switch 22 (such a delay time is less than on the order of 10 ms), and from time t1, outputs the vehicle control values Cvh to the actuators 27 (the driving force device 28, the steering device 30, and the braking device 32) at each of a time interval of ⅕ of the operation cycle Toc. In this case, automated driving of the vehicle 10 is instantaneously started (corresponding to step S9), on the condition that the count values Cpr, Cem, and Cs of the update counters 152, 154, and 173 are updated (corresponding to step S8: YES).

Similarly, at the next time t2, based on the external environment recognition information Ipr4, the local environment map information Iem3, and the host vehicle state information Ivh4, the integrated control unit 70 and the vehicle control unit 110 output to the actuators 27 (the driving force device 28, the steering device 30, and the braking device 32) the vehicle control values Cvh, in which there was used the trajectory point sequence Pj of the short-term trajectory St2 that was generated by the process Pro2 of the short-term trajectory generating unit 73. Automated driving is started from time t1.

In the manner described above, with the vehicle 10 in which the vehicle control device 12 according to the present embodiment is incorporated, after the ON operation of the automated driving switch 22, it is possible to instantaneously transition from the manual driving mode to the automated driving mode.

[Description in Accordance with Time Chart (Also Including Automated Driving in Consideration of the Long-Term Trajectory Lt)]

Next, with reference to the time chart of FIG. 6, an operation of transitioning from the non-automated driving mode (manual driving mode) to the automated driving mode, including operations of the medium-term trajectory generating unit 72 and the long-term trajectory generating unit 71, and operations of the vehicle control device 12 in the automated driving mode will be described.

Figure 6:
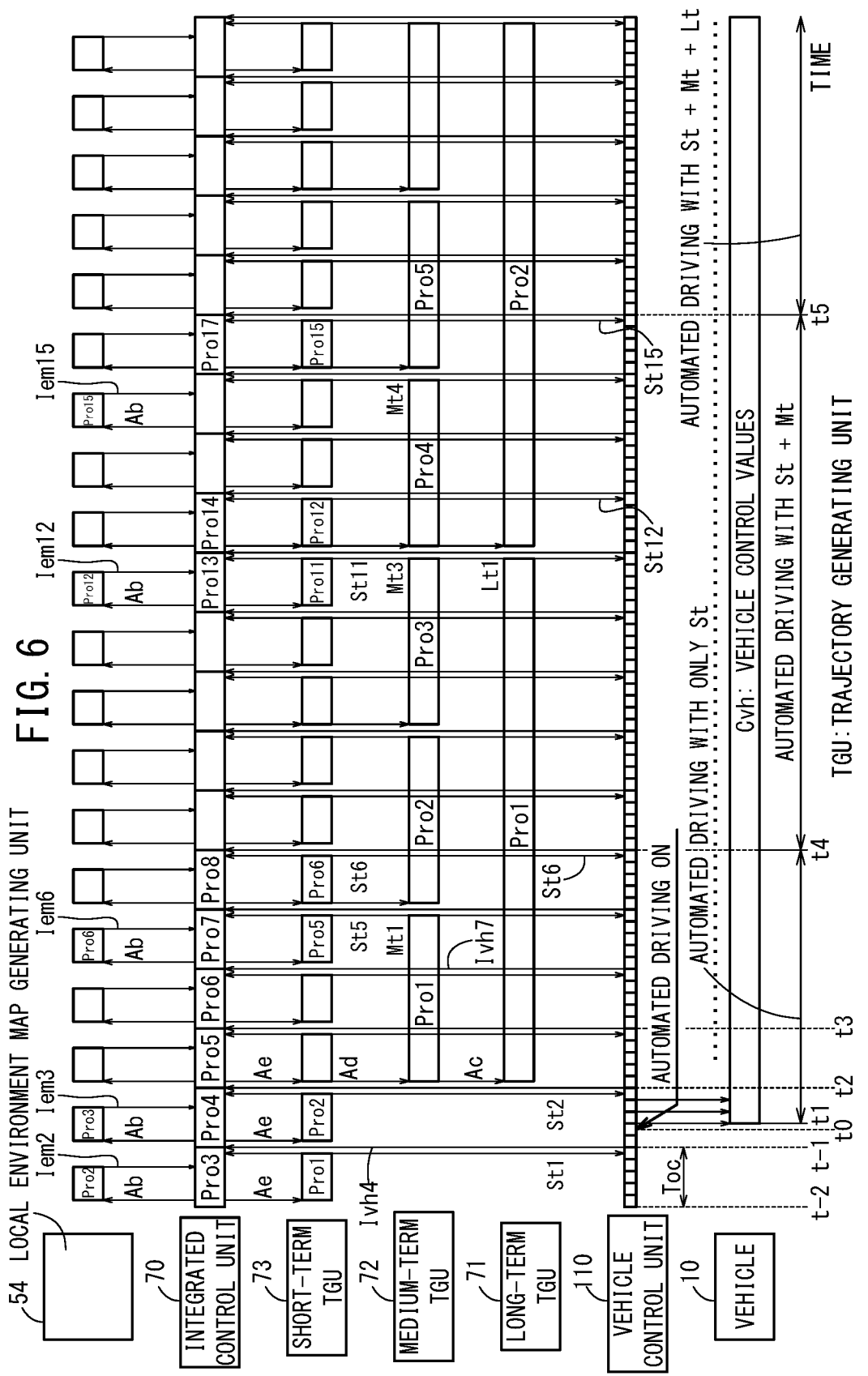
FIG. 6 is a time chart provided to explain operations of the vehicle control device according to the present embodiment.

Although the time chart of FIG. 6 includes the content of the time chart of FIG. 5, to facilitate understanding and avoid complexity, portions thereof (times prior to time t-2, the recognition result receiving unit 52, and the count value Cem1, etc.) have been omitted from illustration.

Further, in the time charts of FIG. 5 and FIG. 6, the same points in time are denoted using the same time symbols t0 and the like. Further, the same processes are denoted using the same process codes Pro1 and the like. Moreover, a portion of the content described with reference to the time chart of FIG. 5 is omitted.

In FIG. 6, at time t0, by switching to the automated driving mode (automated driving: ON state) by operation of the automated driving switch 22, then from time t1, the driving force device 28, the steering device 30, and the braking device 32 are controlled by the vehicle control unit 110 on the basis of the vehicle control values Cvh generated only by the short-term trajectory St1, and automated driving is started instantaneously.

In addition, by detecting that the automated driving switch 22 has been operated and placed in the ON state, in the vicinity of a point in time (time t2) when the process Pro5 by the integrated control unit 70 is started, the operation commands Ae, Ad, and Ac to request generation of the short-term trajectory St3, the medium-term trajectory Mt1, and the long-term trajectory Lt1 are transmitted respectively from the integrated control unit 70 to the short-term trajectory generating unit 73, the medium-term trajectory generating unit 72, and the long-term trajectory generating unit 71.

Moreover, it should be noted that, in the vicinity of the point in time when the process Pro5 of the integrated control unit 70 is started, the operation command Ae to request generation of the short-term trajectory St from the integrated control unit 70 with respect to the short-term trajectory generating unit 73 is continually (continuously) transmitted from the time t-2 prior thereto (refer to FIG. 5).

By doing so, during the process Pro7 (of the integrated control unit 70) when the operation cycle Toc has elapsed roughly three times, the medium-term trajectory Mt1 of the process Pro1 (of the medium-term trajectory generating unit 72) is generated, and is transmitted via the integrated control unit 70 to the short-term trajectory generating unit 73.

In this case, in the process Pro8 (of the integrated control unit 70) during the next operation cycle Toc, normally the short-term trajectory St6 is generated by the short-term trajectory generating unit 73 in which the travel line of the vehicle 10 becomes smoother in consideration of the medium-term trajectory Mt1 of the 5-sec trajectory, and is transmitted to the vehicle control unit 110.

Moreover, having taken into consideration the medium-term trajectory Mt1, when the short-term trajectory generating unit 73 generates the short-term trajectory St6, the surrounding environment is considered on the basis of the velocity vs, the acceleration va, the yaw rate γ, and the steering angle δst at the current position of the host vehicle 10, and a plurality of trajectory point sequence candidates Pcj for selection of the short-term trajectory St6 are generated from the current position (starting point) of the host vehicle 10 to a target point (end point) after 1 [sec].

Additionally, this implies that the respective trajectory point sequence candidates Pcj for the generated short-term trajectory St6 are evaluated on the basis of a later-described evaluation function with respect to the trajectory point sequence Pj of the medium-term trajectory Mt1, together with being evaluated on the basis of a later-described other evaluation function with respect to the local environment map Lmap of the local environment map information Iem6 that is generated by the process Pro6 (of the local environment map generating unit 54), the trajectory point sequence candidate Pcj with a high evaluation is selected, and the short-term trajectory St6 is generated in which the selected trajectory point sequence candidate Pcj is taken as the trajectory point sequence Pj.

The trajectory point sequence Pj of the short-term trajectory St6 is converted through the vehicle control unit 110 into the vehicle control values Cvh at a period of the operation cycle Toc 5, and is output to the actuators 27 to thereby perform automated driving (in FIG. 6, the interval at point t4 and thereafter which is marked "automated driving with St+Mt").

In this case, in the evaluation function of the trajectory point sequence Pj of the medium-term trajectory Mt1, the evaluation is set so as to become higher as the deviation (deviation concerning the vehicle control values Cvh) of the respective elements (position x,y, velocity vs, steering angle δst) at points corresponding to the respective trajectory point sequence candidates Pcj of the short term trajectory St6 and the trajectory point sequence Pj of the medium-term trajectory Mt1 is smaller. Further, in the evaluation function with respect to the local environment map Lmap (the lane L and the optimum travel line of the host vehicle 10 generated from the host vehicle state information Ivh7 and the external environment recognition information Ipr, for example, a lane center line CL in the case of a straight lane, and an out-in-out travel line in the case of a curved lane), the evaluation is set so as to become higher as the deviation (positional deviation in relation to the lane L) between the positions x,y of the respective trajectory point candidates Pcj of the short term trajectory St6 and the optimum travel line, etc., of the local environment map Lmap is smaller. The trajectory point sequence candidate Pcj having the highest weighted sum of the evaluation values of both evaluation functions is set as the trajectory point sequence Pj of the short-term trajectory St6.

Next, during the process Pro13 by the integrated control unit 70 when the operation cycle Toc has elapsed roughly nine times from the starting time t1 of automated driving, the long-term trajectory Lt1 is generated in the process Pro1 of the long-term trajectory generating unit 71, and in the process Pro17 (of the integrated control unit 70) during the operation period Toc, in consideration of the medium-term trajectory Mt4 of the 5-sec trajectory that was generated in consideration of the long-term trajectory Lt1 of the 10-sec trajectory (in consideration of the long-term trajectory Lt1 and the medium-term trajectory Mt4), in the normal case, the short-term trajectory generating unit 73 generates the short-term trajectory St15 which makes the travel line of the vehicle 10 smoother.

Moreover, the short term trajectory St15 having taken into consideration the long-term trajectory Lt1 and the medium-term trajectory Mt4 implies that, when the medium-term trajectory generating unit 72 generates the medium-term trajectory Mt4 in the process Pro4, similar to what was described with the generation process of the short-term trajectory St6, a plurality of candidates for the medium-term trajectory Mt4 made up from a plurality of trajectory point sequence candidates Pcj are generated, the generated respective trajectory point sequence candidates Pcj are evaluated on the basis of evaluation functions of the trajectory point sequence Pj of the long-term trajectory Lt1 that was generated in the process Pro1 (of the long-term trajectory generating unit 71), and the local environment map Lmap of the local environment map information Iem12 that was generated in the process Pro12 (of the local environment map generating unit 54), and the trajectory point sequence candidate Pcj for which the evaluation thereof is high is set as the trajectory point sequence Pj of the medium-term trajectory Mt4.

Furthermore, in this manner, the implication is that the medium-term trajectory Mt4 generated with reference to the long-term trajectory Lt1, and the plurality of candidates for the short-term trajectory St15 are evaluated by the evaluation functions as described above, whereby the short-term trajectory St15 is generated with reference to the medium-term trajectory Mt4 that was generated with reference to the long-term trajectory Lt1.

In FIG. 6, at time t5 and thereafter, in the interval that is marked "automated driving with St+Mt+Lt", automated driving is executed in which the riding comfort and comfortability during traveling is considered sufficiently close to the driving sensation of the driver.

Time Charts of Comparative Example

In the time chart of FIG. 7, at the same scale as the time chart of FIG. 5, an operation of transitioning from the non-automated driving mode to the automated driving mode, and operations of the vehicle control device 12 in the automated driving mode will be described in accordance with a comparative example.

Figure 7:
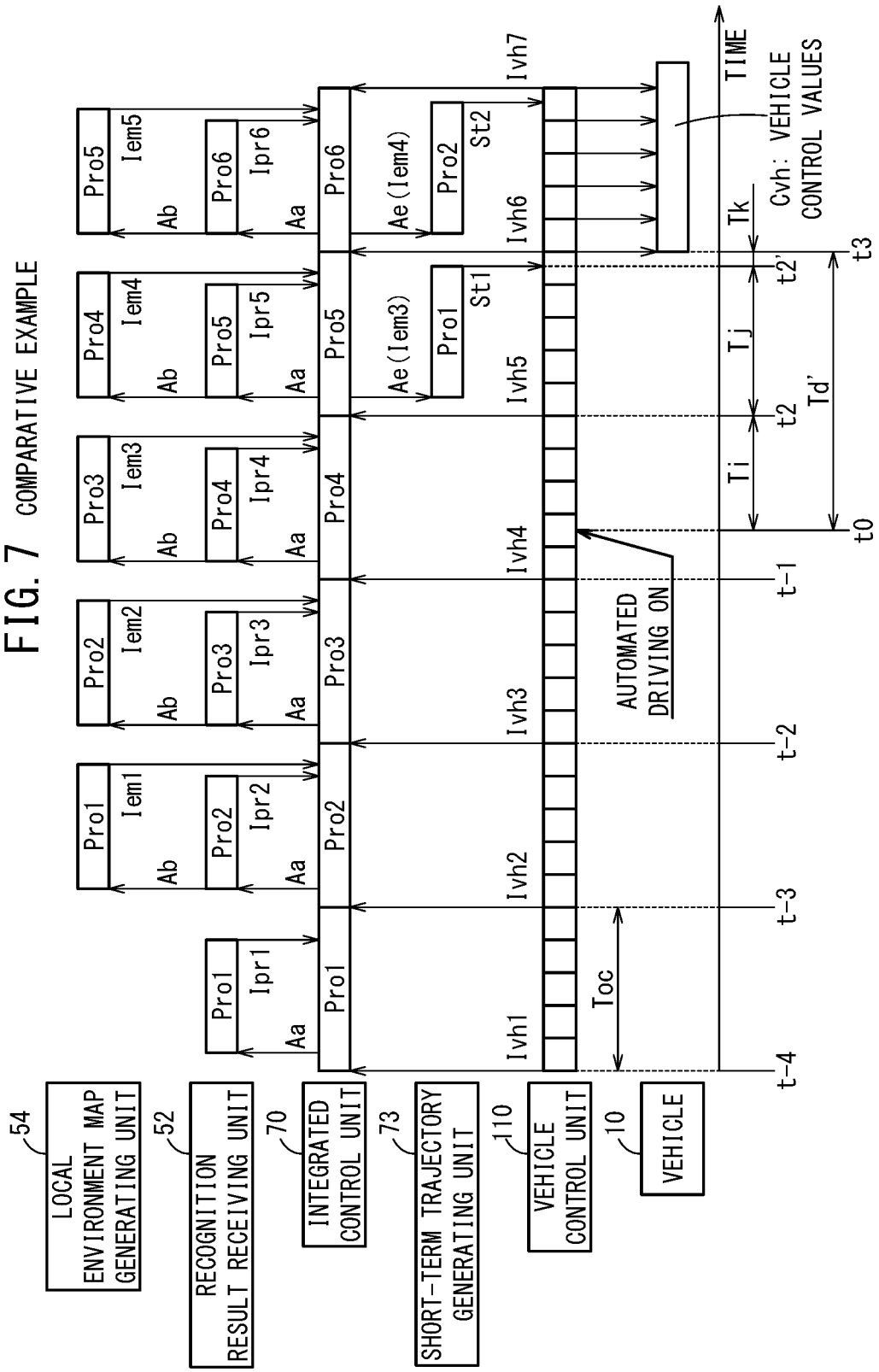
FIG. 7 is a time chart provided to explain operations of the vehicle control device in the vicinity of initiation of automated driving according to a comparative example.

The time points, symbols, and expressions noted in the time chart of FIG. 7 are the same as the time points, symbols, and expressions appearing in the time chart of FIG. 5, and therefore, detailed description of such features is omitted.

In the operations according to the comparative example, after time t0 when the ON state of the automated driving switch 22 has been input to the vehicle control unit 110, at the ending time of the operation cycle (the cycle of the process Pro4 of the integrated control unit 70), or stated otherwise, at the starting time t2 of the period of the process Pro5 of the integrated control unit 70, the vehicle control unit 110 issues a notification to the integrated control unit 70 that automated driving has been placed in the ON state, together with the vehicle state information Ivh5 being received by the integrated control unit 70.

Further, after time t2, in response to the operation command Ae (request to generate the short-term trajectory St1), at a time within the operation cycle Toc of its own process Pro1, the short-term trajectory generating unit 73 generates a short-term trajectory St1, which is made up from the aforementioned trajectory point sequence Pj using the host vehicle state information Ivh5 and the local environment map information Iem3, and at time t2' immediately prior to time t3, outputs the generated short-term trajectory St1 to the integrated control unit 70 and the vehicle control unit 110.

In the vehicle 10 according to the comparative example, automated driving is not started instantaneously from time t0 at which the automated driving switch 22 transitions to the ON state, and from the transition time t0, at time t3 and thereafter, automated driving is initiated on the basis of the short-term trajectory St1, after a time (delay time) Td' which is the sum of the detection time Ti to detect the ON state of the automated driving, the time Tj to generate the short-term trajectory St1 and the processing time Tk by the vehicle control unit 110.

[Summary and Modifications]

As has been described above, according to the aforementioned embodiment, the vehicle control device 12 that controls the vehicle 10 configured to be driven automatically, comprises the long-term trajectory generating unit 71 (or the medium term trajectory generating unit 72) configured to generate the long-term trajectory Lt (or the medium-term trajectory Mt) (of a relatively long time period) having a long period whose operation cycle is relatively long, the short-term trajectory generating unit 73 configured to generate the short-term trajectory St (of a relatively short time period) having the short period Ts which is shorter than the long period Tl, the automated driving switch 22 configured to serve as an automated driving ON setting unit configured to set automated driving to an ON state, and the integrated control unit 70 configured to control these elements.

In this case, when the automated driving is set to the ON state by the automated driving switch 22, from among the long-term trajectory generating unit 71, the medium-term trajectory generating unit 72, and the short-term trajectory generating unit 73, the integrated control unit 70 is configured to control the vehicle 10 in the automated driving mode on the basis of at least the short-term trajectory St generated by the short-term trajectory generating unit 73, and when the automated driving is not set to the ON state (when in the manual driving mode), the integrated control unit 70 is configured to continue to generate the short-term trajectory St by the short-term trajectory generating unit 73.

In this manner, generation of the short-term trajectory St is continued when automated driving is not set to the ON state by the automated driving switch 22. Therefore, when automated driving is set to the ON state by the automated driving switch 22, the vehicle 10 can be controlled by way of automated driving immediately (instantly after having been placed in the ON state) in accordance with the short-term trajectory St which is generated continuously. Further, when not in the ON state, since it is possible to stop the long-term trajectory generating unit 71 and the medium-term trajectory generating unit 72, the processing content can be prevented from being wasted.

Furthermore, there are provided the recognition result receiving unit 52 configured to receive the external environment recognition information Ipr including the lane markings Lm, etc., around a periphery of a host vehicle 10, and the local environment map generating unit 54 configured to receive the external environment recognition information Ipr, and generate the local environment map information Iem indicative of the situation around the periphery of the host vehicle, wherein the generated local environment map information Iem is continuously input to the short-term trajectory generating unit 73.

In accordance with this feature, since the local environment map information Iem is continuously input to the short-term trajectory generating unit 73, when automated driving is set to the ON state by the automated driving switch 22, the automated driving control of the vehicle 10 in accordance with the short-term trajectory St corresponding to the most recent local environment map information Iem can be started instantaneously.

Moreover, since the local environment map information Iem is continuously generated within a time period that is shorter than the operation period Toc (the processing period of the integrated control unit 70, for example, the short period Ts corresponding to the process Pro3), which is the generation period of the short-term trajectory St that is generated using the local environment map information Iem, and is generated in synchronism with the short period Ts, it is possible to secure generation of the short-term trajectory St within the short period Ts (=Toc).

Furthermore, the respective update counters 152, 154, 171, 172, and 173 are provided as counters in which the count values Cpr, Cem, Cl, Cm, and Cs are updated when the recognition result receiving unit 52, the local environment map generating unit 54, the long-term trajectory generating unit 71, the medium-term trajectory generating unit 72, and the short-term trajectory generating unit 73 have respectively updated and generated the external environment recognition information Ipr, the local environment map information Iem, the long-term trajectory Lt, the medium-term trajectory Mt, and the short-term trajectory St.

In this case, when automated driving is set to the ON state by the automated driving switch 22, the integrated control unit 70 determines whether or not the respective count values Cpr, Cem, Cl, Cm, and Cs of each of the update counters 152, 154, 171, 172, and 173 have been updated, and when they have been updated, since the vehicle 10 is controlled to be automatically driven on the basis of at least the short-term trajectory St generated by the short-term trajectory generating unit 73, the reliability of the generated short-term trajectory St is further ensured.

[Modification 1]

There are provided the above-described update counters 152, 154, 171, 172, and 173, and for example, a display or a speaker of the navigation device 16, which serves as an automated driving capability notification unit that issues a notification that automated driving is possible when it is determined by the integrated control unit 70 that automated driving may be initiated.

In this case, when automated driving is set to the ON state by the automated driving switch 22, the integrated control unit 70 determines whether or not the respective count values Cpr, Cem, Cl, Cm, and Cs of each of the update counters 152, 154, 171, 172, and 173 have been updated, and when they have been updated, issues a notification to the interior of the vehicle 10 to the effect that automated driving is possible through the display or the speaker of the navigation device 16, and thereafter, in the case that automated driving is set again to the ON state by the automated driving switch 22 by an operation made by the driver or the like, controls the vehicle 10 to be automatically driven on the basis of at least the short-term trajectory St generated by the short term-trajectory generating unit 73. Therefore, it becomes possible for automated driving to be initiated with the short-term trajectory St that is generated with higher reliability, and it is possible to more reliably confirm the intention of the driver to initiate automated driving.

The present invention is not limited to the embodiment described above, and it goes without saying that various configurations could be adopted therein based on the descriptive content of the present specification.

For example, in the case that automated driving is set to the ON state by the automated driving switch 22 while the vehicle 10 is making a sharp turn, the start of automated driving may be prohibited until the sharp turn has come to an end, and thereafter, automated driving may be initiated. Further, in the case that automated driving is set to the ON state by the automated driving switch 22 while the vehicle 10 is making a sharp turn, generation of the medium-term trajectory Mt and the long-term trajectory Lt may also be initiated.

Further, in the case that automated driving is set to the ON state by the automated driving switch 22, it is preferable that automated driving not be initiated under a condition in which the lane markings Lm cannot be received by the external environment recognition unit 51, and more specifically, under a condition in which the lane markings Lm cannot be recognized by the recognition result receiving unit 52.

[Modification 2]

Figure 8:
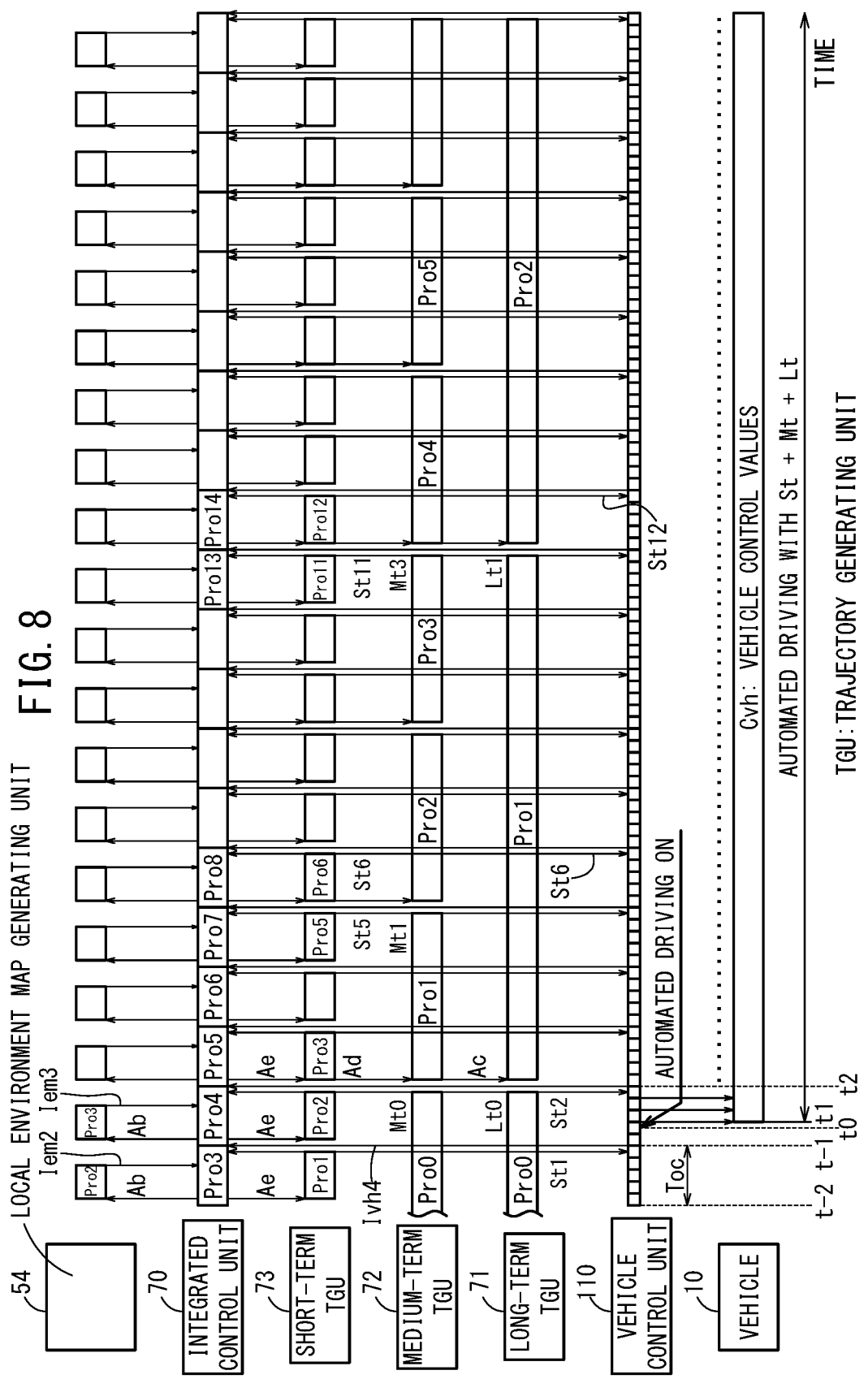
FIG. 8 is a time chart provided to explain operations of a trajectory generating method and the like of a vehicle control device according to a second modification.

FIG. 8 is a time chart provided to explain operations of the vehicle control device 12 according to a second modification.

A vehicle control device 12 according to the second modification and which controls a vehicle 10 that is capable of being driven automatically is equipped with the recognition result receiving unit 52 that receives the external environment recognition information around a periphery of the host vehicle, the local environment map generating unit 54 that receives the external environment recognition information, and generates the local environment map Lmap as information indicative of the situation around the periphery of the host vehicle, the long-term trajectory generating unit 71 to which the local environment map Lmap is input, and which generates the long-term trajectory Lt with a long period Tl=9×Toc whose operation period Toc is relatively long on the basis of the local environment map Lmap, the medium-term trajectory generating unit 72 which refers to the generated long-term trajectory Lt, and generates the medium-term trajectory Mt with a medium period Tm=3× Toc whose operation period Toc is of a relatively medium length, the short-term trajectory generating unit 73 which refers to the generated medium-term trajectory Mt, and generates the short-term trajectory St with a short period Ts=1×Toc that is shorter than the long period Tl and the medium period Tm, the automated driving switch 22 which serves as an automated driving ON setting unit that sets automated driving to an ON state, and the integrated control unit 70 that controls these elements.

In the second modification, when automated driving is set (at time t0) to the ON state by the automated driving switch 22 that serves as the automated driving ON setting unit, at time t1 and thereafter, the integrated control unit 70 controls the vehicle 10 on the basis of the long-term trajectory Lt, the medium-term trajectory Mt, and the short-term trajectory St that are generated by the long-term trajectory generating unit 71, the medium-term trajectory generating unit 72, and the short-term trajectory generating unit 73 (corresponding to a step of controlling the vehicle 10 on the basis of the trajectories).

On the other hand, when automated driving is not set to the ON state (at a point in time prior to time t0), the vehicle 10 is not controlled, but generation of the long-term trajectory Lt by the long-term trajectory generating unit 71, generation of the medium-term trajectory Mt by the medium-term trajectory generating unit 72, and generation of the short-term trajectory St by the short-term trajectory generation unit 73 are continued (corresponding to a step of generating the trajectories without controlling the vehicle 10 when automated driving is not set to the ON state).

For this reason, from time t1, immediately after automated driving has been placed in the ON state, it is possible for automated driving which is superior in terms of adaptability, responsiveness, and riding comfort to be initiated with reference to the long-term trajectory Lt, the medium-term trajectory Mt, and the short-term trajectory St.

The determination process of step S7 described above corresponds to a step of determining whether or not the automated driving ON setting unit is set to the ON state.

Further, although according to the second modification, as shown in FIG. 8, generation of the long-term trajectory Lt, the medium-term trajectory Mt, and the short-term trajectory St is a constituent requirement before and after time t0 at which automated driving is placed in the ON state, instead of this feature, the constituent requirement may be changed to trajectory generating units (the long-term trajectory generating unit 71 and the short-term trajectory generating unit 73) that generate the long-term trajectory Lt and the short-term trajectory St, or the constituent requirement may be changed to trajectory generating units (the medium-term trajectory generating unit 72 and the short-term trajectory generating unit 73) that generate the medium-term trajectory Mt and the short-term trajectory St, or alternatively, the constituent requirement may be changed to a trajectory generating unit (i.e., only the short-term trajectory generating unit 73) that generates only the short-term trajectory St.

For example, generation of the long-term trajectory Lt and/or the medium-term trajectory Mt may be omitted depending on the velocity vs or the like.

Similarly, in all of the embodiments described above, depending on the velocity vs or the like, for example, the medium-term trajectory generating unit 72 may be omitted, and automated driving may be performed with the long-term trajectory generating unit 71 and the short-term trajectory generating unit 73.

The invention claimed is:

1. A vehicle control device that controls a vehicle configured to be driven automatically, comprising:
    a long-term trajectory generating unit configured to generate a long-term trajectory having a long period whose operation cycle is relatively long;
    a short-term trajectory generating unit configured to generate a short-term trajectory with reference to the generated long-term trajectory, and having a short period which is shorter than the long period;
    an automated driving ON setting unit configured to set automated driving to an ON state; and
    an integrated control unit configured to control these elements;
    wherein, when the automated driving is set to the ON state by the automated driving ON setting unit, the integrated control unit is configured to control the vehicle on a basis of the long-term trajectory and the short-term trajectory generated by the long-term trajectory generating unit and the short-term trajectory generating unit, and when the automated driving is not set to the ON state, the integrated control unit is configured to continue to generate the short-term trajectory by the short-term trajectory generating unit.

2. The vehicle control device according to claim 1, further comprising:
    a recognition result receiving unit configured to receive external environment recognition information around a periphery of a host vehicle; and
    an environment map generating unit configured to receive the external environment recognition information, and generate information indicative of a situation around the periphery of the host vehicle;
    wherein the information indicative of the situation around the periphery of the host vehicle which is generated by the environment map generating unit is continuously input to the short-term trajectory generating unit.

3. The vehicle control device according to claim 2, wherein the information indicative of the situation around the periphery of the host vehicle is generated in synchronism with the short period and in a time period that is less than the short period.

4. The vehicle control device according to claim 2, wherein:

each of the short-term trajectory generating unit and the environment map generating unit further comprises a counter whose count value is updated when information thereof is updated and generated; and when the automated driving is set to the ON state by the automated driving ON setting unit, the integrated control unit is configured to determine whether or not the respective count values of the respective counters are updated, and in a case of being updated, control the vehicle on a basis of at least the short-term trajectory generated by the short term-trajectory generating unit from among the long-term trajectory generating unit and the short-term trajectory generating unit.

5. The vehicle control device according to claim 2, further comprising:

an automated driving possibility notification unit configured to issue a notification that automated driving is possible when it is determined by the integrated control unit that automated driving may be initiated;

each of the short-term trajectory generating unit and the environment map generating unit further comprises a counter whose count value is updated when information thereof is updated and generated; and when the automated driving is set to the ON state by the automated driving ON setting unit, the integrated control unit is configured to determine whether or not the count values of the counters are updated, and in a case of being updated, issue the notification that automated driving is possible through the automated driving possibility notification unit, and thereafter, when the automated driving is set again to the ON state by the automated driving ON setting unit, control the vehicle on a basis of at least the short-term trajectory generated by the short term-trajectory generating unit from among the long-term trajectory generating unit and the short-term trajectory generating unit.

6. The vehicle control device according to claim 1, wherein:

the long-term trajectory generating unit, in addition to the long-term trajectory generating unit, is divided into a medium-term trajectory generating unit configured to generate a medium-term trajectory having a medium period that is relatively longer than the short period and relatively shorter than the long period; and when performing automated driving, the integrated control unit is simultaneously configured to initiate generation of respective trajectories in the long-term trajectory generating unit, the short-term trajectory generating unit, and the medium-term trajectory generating unit, while configured to control the vehicle in accordance with the short-term trajectory before the medium-term trajectory is generated, and when the medium-term trajectory is generated, configured to control the vehicle in accordance with the short-term trajectory with reference to the medium-term trajectory, and when the long-term trajectory is generated, configured to generate the short-term trajectory with reference to the medium-term trajectory that was generated with reference to the long-term trajectory, and configured to control the vehicle in accordance with the short-term trajectory.

7. A trajectory generating method in a vehicle control device that controls a vehicle configured to be driven automatically;

the vehicle control device comprising:

a recognition result receiving unit configured to receive external environment recognition information around a periphery of a host vehicle;

an environment map generating unit configured to receive the external environment recognition information, and generate an environment map as information indicative of a situation around the periphery of the host vehicle;

a trajectory generating unit to which the environment map is input, and which is configured to generate a trajectory on a basis of the environment map; and an automated driving ON setting unit configured to set automated driving to an ON state;

the trajectory generating method comprising:

a step of determining whether or not the automated driving ON setting unit is set to the ON state;

a step of controlling the vehicle on a basis of the trajectory generated by the trajectory generating unit, when the automated driving is set to the ON state by the automated driving ON setting unit; and a step of not controlling the vehicle, but performing generation of the trajectory by the trajectory generating unit, when the automated driving is not set to the ON state.

8. A vehicle control device that controls a vehicle configured to be driven automatically, comprising:

a recognition result receiving unit configured to receive external environment recognition information around a periphery of a host vehicle;

an environment map generating unit configured to receive the external environment recognition information, and generate an environment map as information indicative of a situation around the periphery of the host vehicle;

a trajectory generating unit to which the environment map is input, and which is configured to generate a trajectory on a basis of the environment map;

an automated driving ON setting unit configured to set automated driving to an ON state; and an integrated control unit configured to control these elements;

wherein, when the automated driving is set to the ON state by the automated driving ON setting unit, the integrated control unit is configured to control the vehicle on a basis of the trajectory generated by the trajectory generating unit, and when the automated driving is not set to the ON state, does not control the vehicle, but performs generation of the trajectory by the trajectory generating unit.

* * * * *